United States Patent Office 3,183,228
Patented May 11, 1965

3,183,228
21-FLUORO-17α-METHYLPREGNANE
DERIVATIVES
Romano Deghenghi, Montreal, Ontario, and Yvon Lefebvre, Pierrefonds, Quebec, Canada, assignors to American Home Products Corporation, New York, N.Y., a corporation of Delaware
No Drawing. Filed June 14, 1963, Ser. No. 287,761
Claims priority, application Canada, June 25, 1962,
852,382
6 Claims. (Cl. 260—239.55)

This invention relates to orally active progestational agents, to methods for their preparation, and to intermediates used in the preparation thereof. More specifically, our invention relates to progestationally-active 21-fluoro-17α-methyl-steroids of the pregnane series, some of which are characterized further by carrying additional substituents in position 6, preferably halogen or lower alkyl groups, and some of which may also possess double bonds in positions 4 and 6. It also relates to intermediates useful in the preparation of the new progestationally-active steroid compounds.

Generically, the biologically active compounds of the present invention include the compounds of the following general structural formula

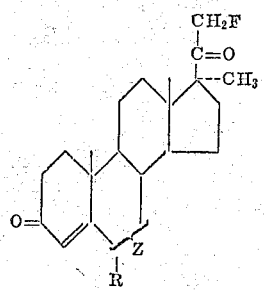

in which (1) R is methyl in the alpha position and Z represents a single bond or
(2) R is methyl and Z represents a double bond or
(3) R is fluorine in the alpha position and Z represents a single bond.

As progestational agents the compounds of this invention are substantially free from undesirable side-effects. They do not cause masculinization of the fetus, nor do they suppress the normal function of the adrenal gland. They are also useful in maintaining pregnancy, and they show unusually prolonged duration of action.

For administration, the progestational agents of the present invention may be compounded with pharmaceutically acceptable carriers.

As orally active progestational agents, the compounds of this invention may be administered in dosage forms such as, for example, tablets or capsules, formulated with a pharmaceutically acceptable carrier, for example, with excipients such as lactose, starch, magnesium stearate, and the like, the individual dosage forms preferably to contain from 5–50 mg. of the active compound.

For intramuscular administration, the compounds of this invention are employed in solution in a pharmaceutically acceptable solvent, such as, for example, a vegetable oil, preferably in dosages of from 10–50 gm. per injection, and for subcutaneous administration, it is convenient to use aqueous suspensions preferably containing from 10–50 mg. of the active compound per millilitre.

A preferred method for the preparation of the compounds of our invention comprises the following steps:

17α-methylpregnenolone (I) is condensed with diethyloxalate in dry ethanol and in the presence of sodium ethoxide to obtain 17α-methyl-21-ethoxalylpregnenolone (II). Treatment of the sodium salt of the latter compound with perchloryl fluoride in dry methanol, followed by treatment with potassium acetate to cleave the ethoxalyl side chain results in 21-fluoro-17α-methylpregnenolone (III). The latter compound is epoxidized with an epoxidizing agent, for example, peracetic acid, to yield the corresponding 5α,6α-epoxide (IV) which is acetylated in the conventional manner to give the corresponding 3-acetate, 3β-acetoxy-21-fluoro-17α-methyl - 5α,6α-oxidopregnan-20-one (V), which in turn treated with a methyl magnesium halide in an inert solvent at a temperature below 35° C., preferably with methyl magnesium bromide in ether solution at room temperature, to yield smoothly 3β,5α-dihydroxy - 6β,17α - dimethyl-21-fluoropregnan-20-one (VI). Alternatively, the same compound VI may also be prepared by treatment of the epoxide IV with a methyl magnesium halide in an inert solvent at a temperature below 35° C., preferably with methyl magnesium bromide in ether solution at room temperature. The dihydroxylated compound VI is oxidized with hexavalent chromium ion, preferably in acetone solution with chromic acid, to yield 21-fluoro-6β,17α-dimethyl - 5α - hydroxypregnane-3,20-dione (VII), which is in turn treated to eliminate the elements of water with concomitant inversion of configuration at carbon atom 6, preferably with sodium hydroxide in methanol, to yield 6α,17α-dimethyl-21-fluoroprogesterone (VIII). Dehydrogenation of the latter compound with chloranil in the conventional manner yields 21-fluoro-6-dehydro-6,17α-dimethylprogesterone (IX).

As a second alternative in our syntheses of 21-fluoro-17α-methyl-steroids of the pregnane series, 3β-acetoxy-21-fluoro-17α-methyl-5α,6α-oxidopregnan-20-one (V), is treated with anhydrous hydrogen fluoride to yield the corresponding fluorohydrin, 3β-acetoxy-6β,21-difluoro-5α-hydroxy-17α-methyl-pregnan-20-one (X), which is in turn hydrolyzed with a strong mineral acid such as, e.g., perchloric acid in methanol solution, to yield 6β,21-difluoro-3β,5α-dihydroxy-17α-methylpregnan-20 - one (XI). The latter dihydroxylated compound XI is then oxidized in the conventional manner with hexavalent chromium ion, preferably with chromic acid in acetone solution, to yield the corresponding 3,20-diketone, 6β, 21-difluoro-5α-hydroxy-17α-methylpregnane-3,20-dione (XII), from which the elements of water may be removed and the configuration at carbon atom 6 may be inverted in the conventional manner, preferably by treating with dry hydrogen chloride to yield 6α,21-difluoro-17α-methylprogesterone (XIII).

The following formulae and examples will illustrate our invention, in which compounds II to VII, and X to XII are intermediates, and in which compounds VIII, IX and XIII are progestationally active.

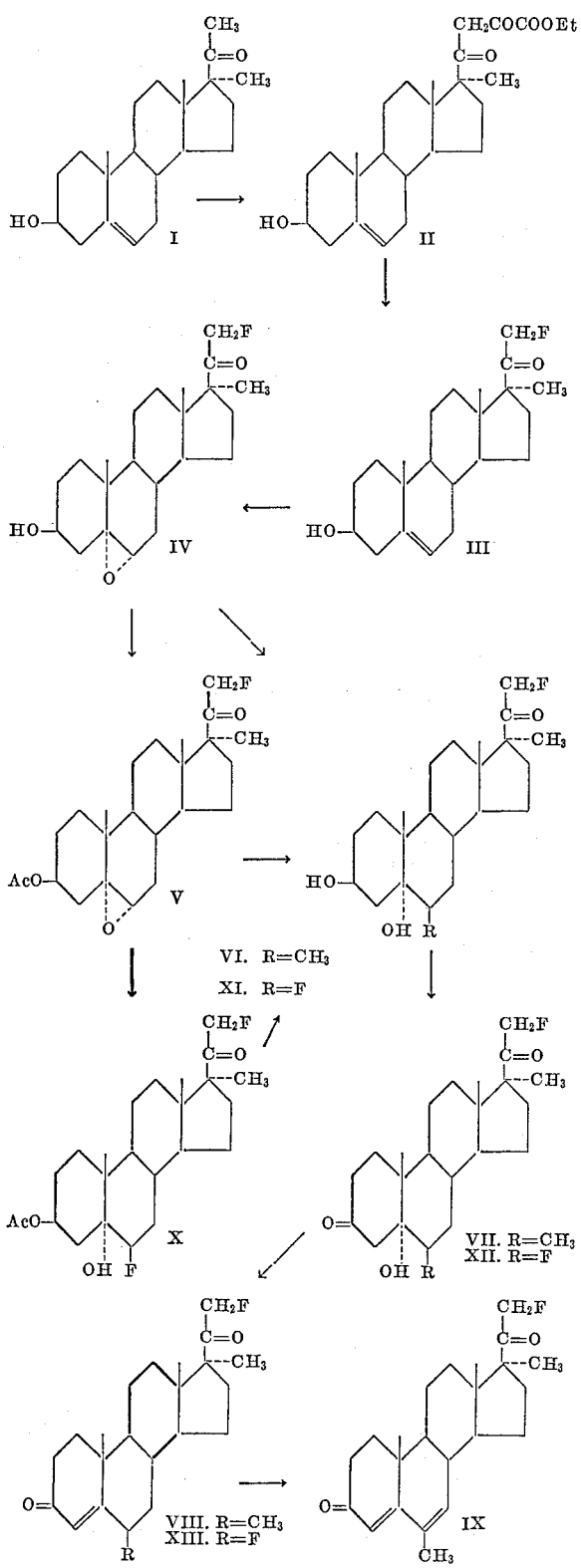

The following examples are illustrative of our invention.

Example 1

To sodium ethoxide, prepared from 2.37 g. of sodium in 215 cc. of dry ethanol are added 25 g. of 17α-methylpregnenolone (I) and 35.5 g. of diethyl oxalate dissolved in 30 cc. of ethanol. The mixture is refluxed for six hours and then left standing at room temperature overnight. After thirty minutes of heating a heavy precipitate forms. The precipitate is filtered and washed with ethanol and ether. The salt is then suspended in ether and enough hydrochloric acid is added to dissolve the solid. The ether is washed free of acid, dried and evaporated to dryness, leaving a colorless solid M.P. 126–128° C. Crystallization of a sample gives pure 21-ethoxalyl-17α-methylpregnenolone (II), M.P. 137–139° C. λ max.=291 mμ ε=8,930.

Example 2

To sodium methoxide, prepared from 2.65 g. of sodium and 200 cc. of methanol, 200 cc. of ether are added, followed by 14.5 g. of 21-ethoxallyl-17α-methylpregnenolone (II) dissolved in 315 cc. of methanol and 440 cc. of ether. Soon after the beginning of the addition a precipitate forms. Stirring is continued for two hours at room temperature. The salt is filtered, washed with ether and dried.

A suspension of 3.08 g. of the above salt in 100 cc. of dry methanol is cooled to −15° to −13° C. Perchloryl fluoride is bubbled through the above suspension for ten minutes, then the cooling bath is removed and the reaction is permitted to proceed at the temperature of a tap water bath until the solution is neutral. The solution at this point is homogeneous. Two-thirds of the volume is evaporated under vacuum and the residue is refluxed for six hours with 6 g. of potassium acetate. After standing overnight at room temperature the mixture is poured into water, and extracted with ether. The ether is washed with water, dried, and evaporated, leaving a practically colorless solid, M.P. 195–199° C. The infrared spectrum shows OH bands and a carbonyl band at 1720 cm.$^{-1}$ characteristic of a 21-fluoro-17α-methyl-20-ketone, in agreement with the spectrum expected for 21-fluoro-17α-methylpregnenolone (III).

Example 3

A quantity of 9.8 g. of 21-fluoro-17α-methylpregnenolone (III) in 150 cc. chloroform was epoxidized at 0° C. for two hours with a mixture of 9.8 cc. peracetic acid and 0.98 g. sodium acetate.

The usual working up gave the 5α,6α-epoxide (IV), M.P. 195–197° C. which was acetylated in the usual way with pyridine (50 cc.) and acetic anhydride (10 cc.) overnight at room temperature to give 3β-acetoxy-21-fluoro-17α-methyl-5α,6α-epoxypregnane-20-one (V), M.P. 213–217° C. (from methanol).

Example 4

To a quantity of the epoxide (V) (1.730 g.) in 120 ml. dry benzene, there was added, at 10–15° C., 36 ml. of a 3 M solution of methyl magnesium bromide in ether. The mixture was stirred at room temperature for seventeen hours. Extraction with ether and washing of the organic layer to neutrality gave, upon evaporation, 1.93 g. of 3β,5α - dihydroxy-6β,17α-dimethyl-21-fluoropregnan-20-one (VI) as an amorphous product characterized by its I.R. absorption spectrum showing bands at 3620 cm.$^{-1}$, 3450 cm.$^{-1}$, and 1716 cm.$^{-1}$.

Alternatively, 7.88 g. of the epoxide IV dissolved in 565 ml. dry benzene and 170 ml. of a 3 M solution of methyl magnesium bromide in ether were stirred at room temperature for seventeen hours. The resulting mixture was worked up as above to yield 9.3 g. of a yellow oil, identical with the compound VI as obtained above.

The latter compound was oxidized by dissolving it in 100 cc. acetone, with 3 cc. of an 8 N solution of chromic acid at 0° C. The usual working up gave 1.5 g. of 21-fluoro-6β,17α-dimethyl-5α-hydroxypregnene - 3,20 - dione (VII), M.P. 220° C.

Example 5

A quantity of 1.75 g. of the hydroxydiketone (VII) is dissolved in 70 cc. of a 5% sodium hydroxide solution in methanol and refluxed for fifty minutes in a nitrogen atmosphere. After cooling 2 cc. of acetic acid were added and the mixture taken to dryness, extracted with ether, washed to neutrality and the residue chromatographed over 40 cc. of alumina. Petroleum ether-benzene mixture eluted the product (VIII), 6α,17α-dimethyl-21-fluoroprogesterone, M.P. 175–177° C. from ether.

Example 6

A quantity of 1.0 g. of 21-fluoro-6α,17α-dimethylprogesterone (VIII) in 30 cc. of isobutanol, was refluxed for ten hours in the presence of 0.82 g. of chloranil. The solution was extracted with ether, washed with sodium hydroxide solution and water, dried and evaporated to give a residue (1.0 g.) which was chromatographed on 30 g. of neutral alumina. Petroleum ether-benzene fractions eluted 21-fluoro-6-dehydro-6,17α-dimethylprogesterone (IX) which was recrystallized from ether for analysis. M.P. 160–162° C. λ max. 292 mμ, log ε=4.4.

Example 7

To 6.8 g. of liquid fluorides at −60° C. are added 15.0 cc. of tetrahydrofuran, 6.8 cc. of chloroform, and 6.8 g. of 3β-acetoxy-21-fluoro-17α-methyl-5α,6α-oxidopregnan-20-one (V) dissolved in 50 cc. of chloroform. The mixture is then left at −10° C. for two hours. The reaction mixture is poured in ice-water containing some sodium bicarbonate. The chloroform solution is washed with sodium bicarbonate and water, dried and evaporated, leaving the crude fluorohydrin (X). The pure 3β-acetoxy-6β,21-difluoro-5α-hydroxy-17α-methylpregnan-20-one (X) melts at 232° C. with decomposition.

Example 8

Four and one-half grams of the fluorohydrin acetate (X) are dissolved in 175 cc. of hot methanol containing 4.5 cc. of 70% perchloric acid. The solution is left at room temperature overnight. Water is added and the resulting solid is filtered, washed free of acid, and dried. The solid is taken up in ether and the insoluble material is filtered, M.P. 192° C. (dec.). Pure 6β,21-difluoro-3β,5α-dihydroxy-17α-methylpregnan-20-one (XI) melts at 198° C. with decomposition.

Example 9

To a solution of 1.6 g. of the diol (XI) in 100 cc. of acetone there is added, at 10° C., 4.03 cc. of an 8 N chromic acid solution. When all of the reagent has been added the mixture is poured in ice-water. The organic compound is extracted with methylene chloride. The organic solution is washed free of acid, dried, and evaporated to dryness. The solid residue is taken up in ether and the insoluble substance is filtered, M.P. 240° C. (dec.). 6β,21-difluoro-5α-hydroxy-17α-methylpregnan-3,20-dione (XII) melts at 245° C., with decomposition.

Example 10

Dry hydrogen chloride is passed through an ice-cold suspension of 1 g. of hydroxy-ketone (XII) in 23 cc. of chloroform for one hour. The mixture is then left at 0° C. for an additional hour. The chloroform solution is washed with water, sodium bicarbonate solution, and finally with water. The residue is a solid, M.P. 165° C. (dec.). Crystallization gives pure 6α,21-difluoro-17α-methylprogesterone (XIII), M.P. 196° C. (dec.). The ultra-violet spectrum of compound XIII shows a maximum of absorption at 236 mμ with an extinction coefficient of 17,400. The infra-red spectrum shows a 21-fluoro-17α-methyl-20-carbonyl band at 1717 cm.$^{-1}$; a conjugated carbonyl band at 1670 cm.$^{-1}$; and a C=C double bond at 1625 cm.$^{-1}$.

We claim:
1. 6α,21-difluoro-17α-methylprogesterone.
2. 21-fluoro-3β-hydroxy-17α-methyl-5α,6α-oxidopregnan-20-one.
3. 3β-acetoxy-21-fluoro-17α-methyl-5α,6α-oxidopregnan-20-one.
4. 3β-acetoxy-6β,21-difluoro-5α-hydroxy-17α-methyl-pregnan-20-one.
5. 6β,21-difluoro-3β,5α-dihydroxy-17α-methylpregnan-20-one.
6. 6β,21-difluoro-5α-hydroxy-17α-methylpregnane-3,20-dione.

References Cited by the Examiner

UNITED STATES PATENTS

| | | | |
|---|---|---|---|
| 3,042,688 | 7/62 | Camerino et al. | 260—397.3 |
| 3,133,913 | 5/64 | Deghenghi | 260—239.55 |

FOREIGN PATENTS

| | | |
|---|---|---|
| 882,388 | 11/61 | Great Britain. |
| 883,310 | 11/61 | Great Britain. |

OTHER REFERENCES

Deghenghi et al.: "Journal of Med. Chem.," vol. 6, May 1963, No. 3, pages 301–304.

LEWIS GOTTS, *Primary Examiner.*

UNITED STATES PATENT OFFICE
CERTIFICATE OF CORRECTION

Patent No. 3,183,228                                                     May 11, 1965

Romano Deghenghi et al.

It is hereby certified that error appears in the above numbered patent requiring correction and that the said Letters Patent should read as corrected below.

In the grant, line 1, and in the heading to the printed specification, line 4, for "Ontario", each occurrence, read -- Quebec --; column 2, line 22, after "which" insert -- is --; column 5, line 22, for "fluorides" read -- fluoride --.

Signed and sealed this 5th day of October 1965.

(SEAL)
Attest:

ERNEST W. SWIDER                                     EDWARD J. BRENNER
Attesting Officer                                          Commissioner of Patents